Patented Sept. 2, 1930

1,774,510

UNITED STATES PATENT OFFICE

HAROLD GROSSMAN, OF CALDWELL, NEW JERSEY, ASSIGNOR OF ONE-FOURTH TO WILLIAM S. PRITCHARD, OF NEW YORK, N. Y.

METHOD OF REFINING PIGMENTS

No Drawing.   Application filed February 2, 1927. Serial No. 165,495.

This invention relates to the refining of pigments for use in paints and the like. Pigments, and more particularly natural pigments such as sienna, ocher and umber, occur in the form of rocks which must be first crushed before the pigments may be formed therefrom. It has been customary to roast the crushed rock in order to dehydrate it, this roasting also developing the color. The roasted material is then ground and washed in large vats of water, this being known as the allutriating process. During this process the pigment and inert ingredients separate to some extent. The specific gravities of the pigment and the other ingredients are not sufficiently different so that perfect separation is obtained, but, generally speaking, the gritty material forming the inert ingredients of the rock is heavier than the pigment and will settle to the bottom of the vats. The pigment is then floated off, dried and ground. However, a great deal of the pigment settles to the bottom and a large portion also of the inert materials will float away with the pigment. This results in forming pigment which is coarse and gritty, and also in wasting a large amount of pigment due to the loss of that portion which settles to the bottom of the vats. The mechanism used in grinding the pigment is also rapidly worn out by the coarse grit present in the pigment.

My invention relates to a method which will avoid the above disadvantages and will result in the production of pigment which can be used in the finer class of products, such as lacquers, varnishes, printer's ink and other substances requiring a finer pigment. It has been impossible to use these pigments in these finer substances when the pigments have been prepared according to prior art practises, because of the presence of so much gritty material in the pigments.

According to my invention I may conveniently start with the usual raw material after it has been given a preliminary grinding. This preliminary grinding usually follows the roasting operation referred to above, or sometimes the roasting is dispensed with. The material is in a convenient form to work with at this stage. I then deflocculate the pigment in the raw material, and by the term "deflocculate" I mean the reducing of the pigment to a fineness such that the dimensions of the particles will be colloidal, or will approach the dimensions of particles having colloidal properties.

The deflocculation may conveniently be accomplished by forming the material into a paste with water having dissolved therein a deflocculant which also acts as a protective colloid such as sulphite liquor waste. The paste is thoroughly mixed, preferably in a colloid mill, although a kneading machine or other mixing device may be used if found suitable. The pigment part of the raw material will then be deflocculated without affecting the gritty inert matter in the raw material.

The mass is then diluted in sufficient water and permitted to stand so that the gritty material forming the foreign matter will settle out. The pigment being held in suspension by the colloid will not settle and is then drawn off in the liquid. To the suspension is then added a solution of an electrolyte, preferably barium chloride, aluminum sulphate, or a solution of a colloid of a charge opposite to the one used to deflocculate the pigment. This step will cause the suspended particles of pigment to flocculate, by which term I mean that the suspension is broken, and the pigment is precipitated. After the flocculation is completed, the supernatant liquid is drawn off and the remaining pigment is filter-pressed, dried and ground. It is then ready for commercial use and will be found to be substantially free from any of the coarser, inert materials which have previously rendered these pigments unfit for use in finer work. Because of the absence of the inert materials the pigment may be ground much finer than has been possible when those materials were present.

In carrying out the invention, no definite proportions of sulphite liquor waste is essential. Any suitable proportion may be used. It has been found in applying this method to mineral earth colors that concentrations of solutions containing as low as 2% of the colloid produce satisfactory results, whereas with mineral colors such as chrome yellow 4% is sufficient. With the lake colors and precipitated mineral colors such as Prussian blue concentrations between 2% and 5% produce satisfactory results. Para red has also been successfully treated with a solution of the colloid containing 5% thereof.

In my method of practising my invention it will be seen that the pigment is deflocculated, as that term has been defined above, which results in the pigment being reduced to a suspension such that the inert part of the raw material may settle out. The resulting pigment is substantially free from the inert material and therefore is of a greatly superior grade. The particles themselves are fine and may be ground still finer so as to be used in the finest kind of work for which pigments are used.

I claim:

1. The method of refining a mineral pigment which comprises deflocculating the pigment with sulphite liquor waste, removing the foreign matter therefrom, and then flocculating the pigment.

2. The method of refining a mineral pigment which comprises deflocculating the pigment with sulphite liquor waste, settling out the foreign matter therefrom, and then flocculating the pigment.

3. The method of refining a mineral pigment which comprises mixing the raw material with sulphite liquor waste to deflocculate the pigment, diluting the mixture with water, settling out the foreign matter, and floating off the pigment.

4. The method of refining a mineral pigment which comprises mixing the raw material with sulphite liquor waste to deflocculate the pigment, diluting the mixture with water, settling out the foreign matter, floating off the pigment, flocculating said pigment, and drawing off the supernatant water.

5. The method of refining a mineral pigment which comprises mixing the raw material with sulphite liquor waste to deflocculate the pigment, diluting the mixture with water, settling out the foreign matter, floating off the pigment, adding thereto an electrolyte to break the suspension, and drawing off the supernatant water.

6. The method of refining a pigment of the metallic oxide type which comprises mixing the raw material with sulphite liquor waste to deflocculate the pigment, diluting the mixture with water, settling out the foreign matter, floating off the pigment, flocculating said pigment and drawing off the supernatant water.

7. The method of refining a pigment of the metallic oxide type which comprises mixing the raw material with sulphite liquor waste to deflocculate the pigment, diluting the mixture with water, settling out the foreign matter, floating off the pigment, adding thereto an electrolyte to break the suspension and drawing off the supernatant water.

In testimony whereof, I have affixed my signature to this specification.

HAROLD GROSSMAN.